UNITED STATES PATENT OFFICE.

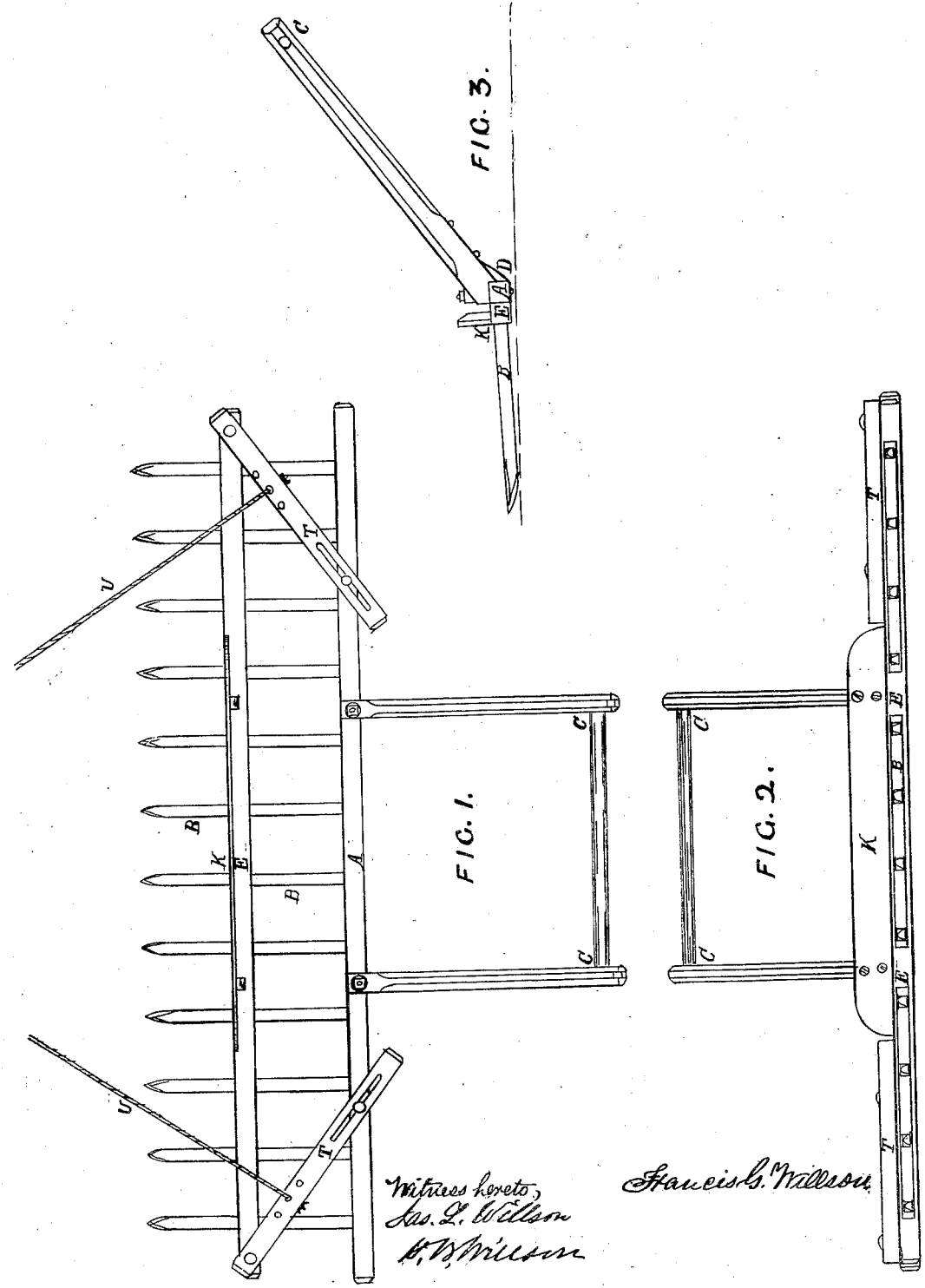

FRANCIS G. WILLSON, OF ONTARIO, CANADA WEST.

IMPROVEMENT IN HAY RAKES.

Specification forming part of Letters Patent No. 32,935, dated July 30, 1861.

*To all whom it may concern:*

Be it known that I, FRANCIS GORE WILLSON, of the village of Ontario, in the Province of Canada, have invented new and useful Improvements in Horse-Rakes; and I do hereby declare that the following is a full and exact description thereof, reference being had to the accompanying drawings, and to the letters of reference marked thereon.

Figure 1 represents the ground plan. Fig. 2, the front elevation; Fig. 3, the end elevation.

The same letters indicate corresponding parts in the different figures.

A is a rake-head made of ash two and one-half inches square, nine feet long, with twelve oak teeth. A smaller size rake has eleven teeth, and is eight feet long, the whole being drawn on a scale of one inch to the foot; teeth B, one and one-eighth inch square, twenty-eight inches long, framed into the head without shoulder in a one and one-sixteenth inch mortise; ash handles C, one and three-fourths by three inches, and one and three-fourths by two and one-fourth inches, and three feet eight inches long, connected at the top by one and one-fourth inch rod two feet four inches high from the ground line, as shown in Fig. 3, and bolted to the head by three-fourths-inch bolts six inches long, and screwed up with nut and bevel-washer. The lower end of handles notch one and one-fourth inches into the head.

E is a slide or stripper, of light wood, composed of a strip or batten five-eighths by two and one-half inches above and below the teeth, with four equidistant blocks three-sixteenths inch thicker than the teeth, four inches long, placed between, the whole put together with two and one-half inch wood-screws, inserted from opposite sides. Dash-board K, four by one-half-inches, and four feet three inches long, fastened to two three-fourths-inch oak studs, prevents the hay going over. Two slotted levers, T, made of ash two and one-fourth by two inches, are pivoted to the head and slide with round one-half-inch bolts with heads, and driven in firmly. The under side of the levers are slightly curved, as in Fig. 2, to prevent friction. Single ropes U, five feet long, which are knotted through one of the graduating holes in the levers, adjust the amount of draft upon either slide or head.

In Fig. 3 the rake is shown in a position for loading. It is unloaded by simply holding back suddenly on the handles while the horse is traveling forward, and the slide moves to the points of the teeth, throwing off the load, and the rake is lifted by the jerk over the windrow. By pushing suddenly forward on the handles the teeth protrude through the slide, the hay and stubble assisting to drive it back against the head when the rake becomes loaded, as before, so that the operation is performed by simply jerking the handles back and forth, and enables one person to hold and drive with ease and facility.

The implement, being light and simple, weighs only between forty and fifty pounds.

I disclaim the devices of levers with connecting-rods and stops in the rake patented to M. & S. Pennock, February 17, 1827; neither do I claim the other parts, separately considered; but What I do claim is—

The slotted levers T, bolted to the head and slide so as to limit and govern the movements of the slide, with the draft-ropes U, attached so as to be adjustable, the whole operating conjointly and in combination with the head A, teeth B, slide E, and handles C, in the manner and for the purpose herein set forth and described.

FRANCIS G. WILLSON.

Witnesses:
   H. E. NELLES,
   C. W. E. NEW.